United States Patent [19]

Peerlkamp

[11] Patent Number: 4,477,400
[45] Date of Patent: Oct. 16, 1984

[54] ROTATIONAL MOLDING METHOD USING POLYOLEFIN POWDER COMPOSITIONS

[75] Inventor: Erik R. Peerlkamp, Born, Netherlands

[73] Assignee: Stamicarbon B.V., Geleen, Netherlands

[21] Appl. No.: 577,335

[22] Filed: Feb. 6, 1984

Related U.S. Application Data

[62] Division of Ser. No. 298,253, Aug. 31, 1981, Pat. No. 4,440,899.

[30] Foreign Application Priority Data

Aug. 30, 1980 [NL] Netherlands ........................ 8004958

[51] Int. Cl.³ ............................................ B29D 27/04
[52] U.S. Cl. ................................. 264/45.7; 264/46.6; 428/318.4; 428/318.8; 525/240; 524/528
[58] Field of Search ............................. 264/45.7, 46.6; 525/240; 524/528

[56] References Cited

U.S. PATENT DOCUMENTS

| | | |
|---|---|---|
| 2,715,075 | 8/1955 | Wolinski ............................ 264/25 X |
| 3,187,069 | 6/1965 | Pincus et al. ........................ 264/45.7 |
| 3,426,110 | 2/1969 | Kesling ............................... 254/45.7 |
| 3,503,922 | 3/1970 | Carton ................................ 524/528 |
| 3,527,667 | 9/1970 | Larsen et al. . | 
| 3,607,987 | 9/1971 | Walton et al. ...................... 525/240 |
| 3,639,189 | 2/1972 | Hartman ............................. 156/244 |
| 3,923,937 | 12/1975 | Piccioli et al. ...................... 264/45.7 |
| 3,936,565 | 2/1976 | Good ............................. 264/45.7 X |
| 3,995,984 | 12/1976 | Fetherston et al. ................. 425/521 |
| 4,104,335 | 8/1978 | Allen ................................... 524/328 |
| 4,129,552 | 12/1978 | Galaj et al. ......................... 524/528 |
| 4,158,686 | 6/1979 | Boeckmann ....................... 264/45.7 |
| 4,167,382 | 9/1979 | Freedman .......................... 425/256 |
| 4,255,221 | 3/1981 | Young ................................ 156/382 |
| 4,307,133 | 12/1981 | Haselier ............................. 427/195 |

FOREIGN PATENT DOCUMENTS

| | | |
|---|---|---|
| 251057 | 1/1963 | Australia . |
| 714619 | 7/1965 | Canada . |
| 2617357 | 11/1976 | Fed. Rep. of Germany . |
| 1494898 | 12/1977 | United Kingdom . |
| 1532629 | 11/1978 | United Kingdom . |

OTHER PUBLICATIONS

Encyclopedia of Polymer Sci. & Tech. vol. 9, pp. 118–137, (1968).
Effect of Mold Release Agents, TSM-226, Phillips Petroleum, Nov. 1977.
Marlex Crosslinkagle High Density Polyethylene Resins for Rotational Molding, TSM-244, Phillips Petroleum, Nov. 77.
Precautions to be Observed in Working with Marlex CL-50 and CL-100 Resins, Phillips Pretoreum, Nov. 1976.
Marlex CL-50 Rotational Molding Crosslinkable High Density Polyethylene, Phillips Petroleum, Oct. 1977.
Physical Property Data Sheet for Tenite 4G7DP, Eastman Kodak, Dec. 1980.
Material Safety DAta Sheet for Tenite 4G7DP, Eastman Kodak, Aug. 1982.
E. G. Hancock, Propylene and its Industrial Derivatives, (1973), John Wiley & Sons, New York, pp. 193–194.
Marlex CL-100 Rotational Molding Crosslinkable High Density Polyethylene Powder, Phillips Petroleum, May 1978.
Precuations to be Observed in Working with Marlex CL-50 and CL-100.
Resins, Phillips Petroleum, Mar. 1981.
Marlex HMN TR-954, Ethylene Hexene Copolymer, Phillips Petroleum, Nov. 1981.

*Primary Examiner*—Carman J. Seccuro
*Attorney, Agent, or Firm*—Cushman, Darby & Cushman

[57] ABSTRACT

A polyolefin composition having improved adhesion to foamable plastic substrates, comprising an intimate mixture of about 20% to about 99.5% by weight of a first stabilized polyolefin powder and from about 0.5% to about 80% by weight of a second at most slightly stabilized polyolefin powder, said second powder having a crystalline melting point which is at least 1° higher than that of said first powder and wherein said second powder has the ability to be oxidized under process conditions.

10 Claims, No Drawings

ROTATIONAL MOLDING METHOD USING POLYOLEFIN POWDER COMPOSITIONS

This is a division of application Ser. No. 298,253, filed Aug. 31, 1981, now U.S. Pat. No. 4,440,899.

BACKGROUND AND SUMMARY OF THE INVENTION

The invention relates to compositions of polyolefin powders, in particular polyethylene powders, having improved adhesion to substrates and to objects having outer coatings made from such compositions.

Polyolefin plastics are more or less inert because of their structure. Polyolefins, such as polyethylene and polypropylene, are now produced on a very large scale. Polyethylene is generally more inert than polypropylene. Therefore polyethylene is difficult or impossible to bond to substrates. It hardly adheres or does not adhere at all to substrates, such as metal surfaces, foamed plastics or the like. To make polyethylene adhere to such a substrate adhesives must be emplLyed, or the surface of the polyethylene and/or the substrate must be etched. However, using adhesives has achieved only a limited degree of adhesion because ofthe generally poor bonding properties of polyethylene. Moreover, adhesives require extra treatment, which increase the cost and price. Etching of one or both of the surfaces to be bonded together is a laborious process, which also lengthens production time and increases the cost price. Similar difficulties are encountered where polypropylene is employed.

It is already known that shaped objects can be made from plastics by heating powders in a mold. The powder melts on the hot wall and forms a layer. The surfaces of the objects to be made may be thus formed by a single layer or by several layers. Foam structures in between layers or against a layer may also be employed to improve insulating properties or to limit the combined weight of the shaped objects. The surface layer and the foamed or unfoamed layer in contact therewith should, of course, adhere to each other. However, particularly with polyethylene the present levels of adhesion leave much to be desired. The same holds true for polypropylene as well.

This problem has been encountered particularly in the manufacture of surfboards, which are mostly made by rotational molding to form an outer wall of polyethylene. In particular, polyethylene having high or medium density, i.e. a density of at least 0.930 g/ml has been employed therein. It is also possible to use lower density polyethylene. A polyurethene foam fills the interior space defined by the surface layers or wall formed on the mold surface.

During use, however, the outer polyethylene outer wall may be damaged. Water can then penetrate into the foam itself. If there is good adhesion between the outer wall and foam then damage is less likely to occur. In this latter case water can penetrate into the foam only under the damaged spot, whereas if adhesion is poor, water can be distributed between the wall and foam and can thus be absorbed by all of the foam. Good adhesion between the outer polyethylene skin layer and the polyurethane cover is highly desirable for surfboards in particular, but is also important for other objects built up of similar components. Consequently, there remains a definite need for good adhesion.

U.S. Pat. No. 3,639,189 proposes to improve the adhesion of polyethylene to metal substrates by blending the polyethylene with oxidized polyethylene. The oxidized polyethylene is obtained by heating polyethylene in an oxygen atmosphere at temperatures that may range from about 90° C. up to the crystalline melting point of the polyethylene until the desired degree of oxidation has been attained. Next, the unoxidized polyethylene is melt-blended with the oxidized polyethylene, and the mixture is then granulated. The thus obtained granulate is used to form the layers on a metal substrate by method mentioned above. However, polyethylene oxidation is a laborious process and increases the cost and eventual price of the composition employed as a starting material to produce coated polyethylene shaped objects.

A composition of this kind is also undesired in the manufacture of surfboards, for example, because oxidized polyethylene lowers the resistance of the polyethylene composition to atmospheric influences. Notably the resistance thereof to thermal and oxidative attack is lowered. In particular, this is highly undesirable for an outer wall, such as the polyethylene coating or a surfboard, which is exposed to outdoor atmospheric influences. This drawback might be overcome by introducing more stabilizer additives in the polyethylene composition employed. However, adding stabilizer also increases the cost and price.

Moreover, compositions containing oxidized polyethylene when used to manufacture objects in a mold by, for instance, rotational molding, have another disadvantage. These compositions strongly adhere to the mold surface itself which makes it difficult to remove the finished article. Even if a non-oxidized polyethylene is used, it is still necessary to apply release agents in order to facilitate the release of the polyethylene object from the mold. When oxidized polyethylene is used difficulties are still encountered in removing the object from the mold even if release agents are employed.

It has already been attempted to improve properties as well as adhesion by applying a crosslinked polyolefin, by preference a cross-linked polyethylene, or by cross-linking the polyethylene after it has been formed into a surface layer. Improved adhesion proved to be possible, but a disadvantage remained. Damage to the surface layer remained difficult or impossible to repair.

It has now been found according to the present invention that improved adhesion of polyolefins, in particular polyethylene, to another plastic substrate, such as polyurethane foam, can be achieved without polyethylene or another polyolefin strongly adhering to the mold wall during the molding process by using a polyolefin composition having about 20% to about 99.5% by weight of a stabilized polyolefin powder and about 0.5% to about 80% by weight of an unstabilized or hardly stabilized polyolefin powder having a crystalline melting point that is at least 1° C. higher than that of the stabilized polyolefin. By preference the crystalline melting point of the unstabilized or hardly stabilized component is at least 4° C. higher than that of the stabilized component. At the same time adherence of the polyolefin to the mold surface during the molding operation is substantially reduced.

DETAILED DESCRIPTION

The composition provided according to the present invention comprises a stabilized and an unstabilized component where the unstabilized component is capable of forming oxidized groups, such as C=O, during processing. These compositions are particularly suitable for rotational molding, as will be explained with reference to this technique. However, the possible applications of the compositions of the present invention are not restricted to rotational molding. Damage to the surface layers made from the composition according to the invention can be easily repaired by melt-welding.

So-called rotational molding is a procedure in which a quantity of a synthetic thermoplastic is introduced into a mold which can rotate and/or at least rock back and forth about one or more axes. The mold is meanwhile heated to above the melting point of the plastic, and the rotational or rocking motion evenly distributes the powder over the mold surface.

If so desired, by introducing another quantity of the same or a different plastic or plastic composition into the mold, a number of layers can be formed. The interior space defined by the plastic wall, as formed in one or more layers against the mold wall, can then be filled with a suitable foam, such as polyurethane foam. The foam should adhere to the adjacent polyolefin layer, but the complete object should also be readily released from the mold at the end of the molding process. The compositions provided according to this invention satisfy these requirements.

The polyolefin compositions according to the present invention are, by preference, polyethylene compositions. Compositions of polyethylene with unstabilized or slightly stabilized polypropylene or polypropylene compositions can also be used. Of the other olefin polymers, only the polyisobutylenes have present commercial importance. These elastomers, mostly marketed in a modified form, are mainly used in other fields. Further, limited amounts of polybutylene and poly-4-methylpentene-1 are sold on the market. However, use of these polymers is also encompassed by the invention.

In addition to homopolymers, many copolymers are produced. The extent to which these are suitable for rotational molding depends on their composition. It is possible, for instance, in the case of polyethylene to lower the melting point by copolymerizing ethylene with small amounts of one or more other olefins. As the components of a composition, therefore, the stabilized component is preferably a copolymer of ethylene, whereas the non-stabilized component is preferably a homopolymer or a copolymer of ethylene with a lower comonomer content, so that its crystalline melting point is at least about 1° C. and preferably at least about 4° C. higher than that of the stabilized component.

The invention will be further elucidated and described with reference to polyethylene, but as appears from the foregoing it is not restricted to the use of this particular polyolefin.

Polyethylene is generally marketed in a granular form. For applications such as rotational molding, polyethylene has to be used in powder form, however, the useful particle size of such powders is below about 2 mm, preferably below about 1 mm. More particularly, such powders have a particle size in the order of about 0.5 mm, that is 0.3 mm to about 0.6 mm. In most cases the powders are prepared by grinding of a granulate. Polyethylene is also directly available in the form of a powder, if the polymerization is carried out in a so-called suspension process or a gas-phase process. However, the morphological and rheological properties of the polyethylene powders so obtained are generally poor. Therefore polyethylenes are usually first granulated and then ground.

The polyethylene processing, in particular high-density polyethylene, takes place at temperatures above about 140° C. For this reason the granulate is stabilized to protect against thermal breakdown. The polyethylene is also stabilized to protect against oxidative attack and from the influence of light, in particular UV radiation. The polyethylene is stabilized in order to make objects formed from such a polyethylene resistant to atmospheric influences. Stabilization against oxidative modification is also necessary to prevent rapid degradative attack when the polymer comes into contact with oxygen, e.g. oxygen in the air during processing. In many cases small amounts of stabilizers for providing protection from thermal and oxidative modification are added after polymerization to protect the polymer during further processing.

During the granulation at the end of the processing operation, further amounts of stabilizers are added. If this addition is omitted, a non-stabilized or only slightly stabilized polyethylene is obtained, that is a polymer containing less than 0.01% by weight, more particularly less than 0.005% by weight stabilizing agents.

Now, if such a non-stabilized polyethylene is used to make shaped objects in a mold, for instance by rotational molding, oxidative modifications will occur wherever the polyethylene contacts air at elevated temperature. In most cases air is present in the mold. When the mold is heated this will result in a noticeable oxidative modification of the polyethylene, such as oxidation, whether or not accompanied by chain break-down, cross-linking, etc. This gives the polyethylene improved adhesion.

The presence of stabilizers results in the polyethylene being left unoxidized or almost unnoticeably oxidized under processing conditions. The effect of the invention is brought about by the presence of oxidized groups in the polyethylene, which groups should be capable of forming in the unstabilized component during processing. This can easily be demonstrated by means of infrared analysis. It can also be established unequivocally by forming each component separately into a layer under the normal processing conditions, and then subjecting these layers to infrared analysis. The unstabilized or slightly stabilized polyethylene then shows a clearly visible band at 1650-1800 $cm^{-1}$, which is indicative of C=O bonds. If it is to keep its good mechanical properties, the stabilized polyethylene should not, or at most hardly at all, exhibit such a band.

If a polyurethane foam is introduced onto a skin made of an unstabilized or little stabilized polyethylene, adhesion is now found to be so strong that attempts to sever the polyethylene from the polyurethane foam results in rupturing of the foam. The rupture does not occur at the boundary between the surface layer and the foam. An unstabilized or slightly stabilized polyethylene adheres strongly to the polyurethane foam or to other substrates. However, formed from unstabilized or slightly stabilized polyethylene, such a layer has insufficient resistance to atmospheric influences, so that objects made therefrom will weather and deteriorate in an unacceptably short time. In addition, such a layer adheres to the mold wall. Even if release agents are used, it proves difficult to remove the object from the mold.

The use of the compositions according to the present invention results in good adhesion to the substrate, while retaining easy releasability from the mold wall. A coating made of the compositions according to the present invention is also resistant to weathering.

Although not intending to be bound thereby, it is assumed that if a polyethylene composition according to the invention is made into a layer or a wall, for instance by rotational molding, the thin section of that layer in direct contact with the mold wall is largely or even completely of the stabilized polyethylene. During molding little or no oxidation of the stabilized polyethylene has occurred. When the wall is heated the stabilized component which has a lower crystalline melting point than the unstabilized or slightly stabilized component will start to melt first and thereby form an initial very thin layer of stabilized polyethylene in contact with the mold wall. The particles of the unstabilized component, which have a higher melting point, may stick to the melting stabilized component particles and then melt in their turn as the temperature rises further. Thus any actual separation between stabilized and unstabilized polyethylene may at best be incomplete. However, the formation of the very thin external layer consisting almost entirely of stabilized polyethylene already insures that the desired surface layer characteristics will be obtained. The unstabilized or hardly stabilized polyethylene will be slightly oxidized. This oxidized polyethylene is in contact with the inner surface of the first-formed layer, which has been in contact with air at elevated temperature for the longest time. This surface will now show good adhesion to the substrates to which it is applied.

Infra-red analysis of a layer made by rotational molding of a composition according to the present invention very clearly showed the presence of C=O groups on the inner or interior side of the wall. This was revealed by the occurrence of a band at 1650-1800 cm$^{-1}$, whereas the outer side of the wall did not show such a band at 1650-1800 cm$^{-1}$. It may therefore be concluded that the inner wall has been oxidized, whereas the outer or external wall shows an almost insignificant degree of oxidation. Of course, some oxidation of the outer wall cannot be completely prevented in every case. In some cases this results in the occurrence of a very weak band at 1650-1800 cm$^{-1}$. Although a small degree of oxidation is permissible, it should be avoided or kept as limited as possible.

When a composition according to this invention is subjected to rotational molding it is necessary on the one hand that such a degree of oxidation occurs as will ensure good adhesion to the substrate. On the other hand it is necessary that the oxidation is not carried so far that release from the mold can give rise to difficulties, and/or that stabilization can present problems. These are the points which have to be taken into account when deciding how much of the unstabilized component will be used. Less than about 0.5% by weight of the unstabilized component has hardly any effect at all, and over about 80% by weight of the unstabilized component is likewise undesirable. By preference the compositions according to the invention contain about 10% to about 30% by weight of unstabilized polyolefin, in particular about 10% to about 30% by weight unstabilized or slightly stabilized polyethylene. By preference the stabilized component is a polyethylene copolymer having a minor quantity of another olefin other than ethylene.

During the processing of a composition according to the present invention, for instance by rotational molding, migration of stabilizing agents occurs. Insofar as this does not already result in a homogeneous distribution such distribution will be reached in the course of time as migration continues, albeit slowly, at ambient temperature. The layer of polyethylene will then end up being uniformly stabilized and resistant to atmospheric influences. If this situation is to be reached, it is, of course, necessary that the polyethylene composition should contain a sufficient quantity of stabilizing agents. This has to be taken into account in the preparation of the components.

In general, stabilized polyethylene contains at least about 0.01% by weight of stabilizing agents, and in most cases totals at least about 0.025% by weight of stabilizing agents. The amounts of stabilizing agents incorporated in the polyethylene are determined by the stability desired. In most cases more than one stabilizing agent is added because stabilization against varous effects is desired. Also many combinations of stabilizing agents bring synergetic effects.

There are many commercially available stabilizers. Any person being skilled in the art can make a proper selection thereof, and that is very well known in the art. what stabilizer(s) is (are) selected in the present compositions is immaterial. The advantages of the present invention are due to the different amounts of stabilizers in the outer layer and in the inner layer of the polyethylene skin and not to the particular stabilizers used.

Like most macromolecular substances, polyethylene has no sharply defined melting point. By means of Differential Scanning Calorimetry (indicated by DSC) a temperature-enthalpy curve is obtained. In the so-called melting of polyethylene a DSC curve with a distinct peak is obtained. The temperature at which the maximum in the melting range occurs with a heating rate of 5° C./min can be designated as called the crystalline melting point.

Each component in the compositions according to the invention may itself be composed of two or more polyolefins. For polyethylene compositions use may be made of low-density as well as of high-density material, but polyethylene with a density of at least about 0.930 g/ml is generally preferred. Low-density polyethylene has a considerably lower melting point than high-density polyethylene. The melting range of low-density polyethylene usually runs from about 108° C. to about 112° C., whereas high-density polyethylene (homopolymer) melts about from 131° C. to about 137° C. Copolymers have a lower density value and a lower melting point.

The compositions according to the invention, and notably the components of which they are made up, may contain the normally used additives, such as colorants, fillers and the like.

The invention will now be further elucidated and illustrated in the following non-limiting examples.

EXAMPLE 1

80 parts by weight of a powdery polyethylene having a melt index (ASTM D-1238, condition E) of 4.5, a density of 0.938 g/ml, and a mean particle size of 450 μm, which had been stabilized with 0.25% by weight 2-hydroxy-4-n-octyloxy-benzophenone (UV stabilizer) and 0.05% by weight octadecyl-3-(3,5-di-tert.butyl-4-hydroxyphenyl)propionate (thermal stabilizer an antioxidant) was mixed with 20 parts wt. of a second powdery polyethylene having a melt index of 8, a density of 0.963 g/ml, and a mean particle size of 450 μm, which contained only 0.004% by weight of the octadecyl-3-

(3,5-di-tert.butyl-4-hydroxyphenyl)propionate. The second component will hereinafter be referred to as the unstabilized component. The crystalline melting temperature of the stabilized component (peak temperature in DSC, heating rate 5° C./min) was 126° C., while that of the unstabilized component 133° C.

A hollow shape was produced from the thoroughly mixed product by rotational molding. The maximum mold temperature was about 275° C., the rotation time was 15 min. Next, polyurethane was foamed inside the hollow shape and allowed to cure. The resulting object was readily released from the mold. Thereafter, sections having a surface area of 5×6 cm were cut from the resultant object, so that blocks of polyurethane foam covered with a polyethylene coating on two sides were obtained. These blocks were subjected to a tensile test in which an elongation rate of 1 cm/min was applied.

The strength of the bond between the polyethylene and the polyurethane could not be established, since the polyurethane from itself ruptured first. However the bond was at least 0.260 N/mm$^2$.

COMPARARTIVE EXAMPLE A

Example I was repeated but using only the stabilized component. Determination of the bonding strength presented difficulties, since the polyethylene coating already began to come loose when the polyurethane foam blocks were being clamped in the machine. In the tensile test the polyethylene layer separated completely from the foam structure before even a measurable value could be recorded. The plane of separation was clean, with no polyurethane foam adhering to the polyethylene.

COMPARATIVE EXAMPLE B

Example I was repeated using only the unstabilized component. In this instance, release of the foam filled object from the mold was attended by severe difficulties, but was eventually achieved. The bond strength between the polyurethane and foam was at least 0.270 N/mm$^2$. In the tensile test the polyurethane foam ruptured.

EXAMPLE II 90 parts by weight of powdery polyethylene having a melt index (ASTM D 1238) of 4.5, a density of 0.938 g/ml, and a mean particle size of 450 μm, stabilized with 0.25% by weight 2-hydroxy-4-n-octoxybenzophenone (UV stabilizer) and 0.05% by weight octadecyl-3-(3,5-di-tert.butyl-4-hydroxyphenyl)propionate (thermal stabilizer and anti-oxidant), was mixed with 10 parts by weight of a powdery polypropylene having a melt index (ASTM D-1238, condition L) of 10, a density of 0.910 g/ml, and a mean particle size of 400 μm, which had not been stabilized. The crystalline melting point of the stabilized component was 126° C. and that of the unstabilized component was 165° C. This mixture was then used to produce a hollow object in the manner described in Example I. Again, release of the object from the mold was easily achieved. In a tensile test, as described in Example I, rupturing of the foam occurred when the tensile force increased above 0.260 N/mm$^2$.

I claim:

1. In a rotational molding process for preparing foamed plastic objects coated with an outer adhering polyolefin layer, said layer defining an enclosed volume filled with foamed plastic, including first preparing said polyolefin layer in a rotational mold, and thereafter introducing a foamable plastic into the enclosed volume defined by said polyolefin layer and foaming said plastic therein; the improvement consisting essentially of preparing said polyolefin layer by rotationally molding:

a polyolefin composition comprising an intimate admixture of about 20% to about 99.5% by weight of a first stabilized polyolefin powder containing at least 0.01 weight % of a stabilizing agent and about 0.5% to about 80% by weight of a second at most slightly stabilized polyolefin powder having a crystalline melting point which is at least 1° C. higher than that of said first stabilized polyolefin, and employing process conditions wherein said second polyolefin powder is oxidized, wherein the surface of said polyolefin layer contacting the wall of said mold consists substantially of stabilized polyolefin whereas the interior surface of said polyolefin layer consists substantially of oxidized polyolefin.

2. Process according to claim 1, wherein said second powder has a crystalline melting point which is at least 4° C. higher than that of said first powder.

3. Process according to claim 1, wherein said polyolefin composition further comprises about 70% to about 90% by weight of said first stabilized power and about 10% to about 30% by weight of said second at most slightly stabilized powder.

4. Process according to claim 1, wherein said second powder contains less than about 0.01% stabilizing agents by weight.

5. Process according to claim 1, wherein said second powder contains at most about 0.005% by weight stabilizing agents.

6. Process according to claim 1 wherein said first powder contains at least about 0.025% by weight of a stabilizing agent.

7. Process according to claim 2, wherein said polyolefin composition comprises about 70% to about 90% by weight of said first stabilized powder and about 10% to about 30% by weight of said second at most slightly stabilized powder.

8. Process according to claim 6 or 7, wherein said second powder contains less than about 0.01% weight of a stabilizing agent.

9. Process according to claim 6 or 7, wherein said second powder contains at most about 0.005% by weight of a stabilizing agent.

10. Process according to claim 6 or 7, wherein said first powder is composed of an ethylene copolymer, said second powder is composed of either an ethylene homopolymer or an ethylene copolymer having a non-ethylene monomer content less than the non-ethylene co-monomer content of the copolymer comprising said first powder, and said foamable plastic is polyurethane.

* * * * *